No. 654,461. Patented July 24, 1900.
H. KOESTER.
PIPE THREADING MACHINE.
(Application filed Jan. 15, 1900.)
(No Model.) 5 Sheets—Sheet 1.
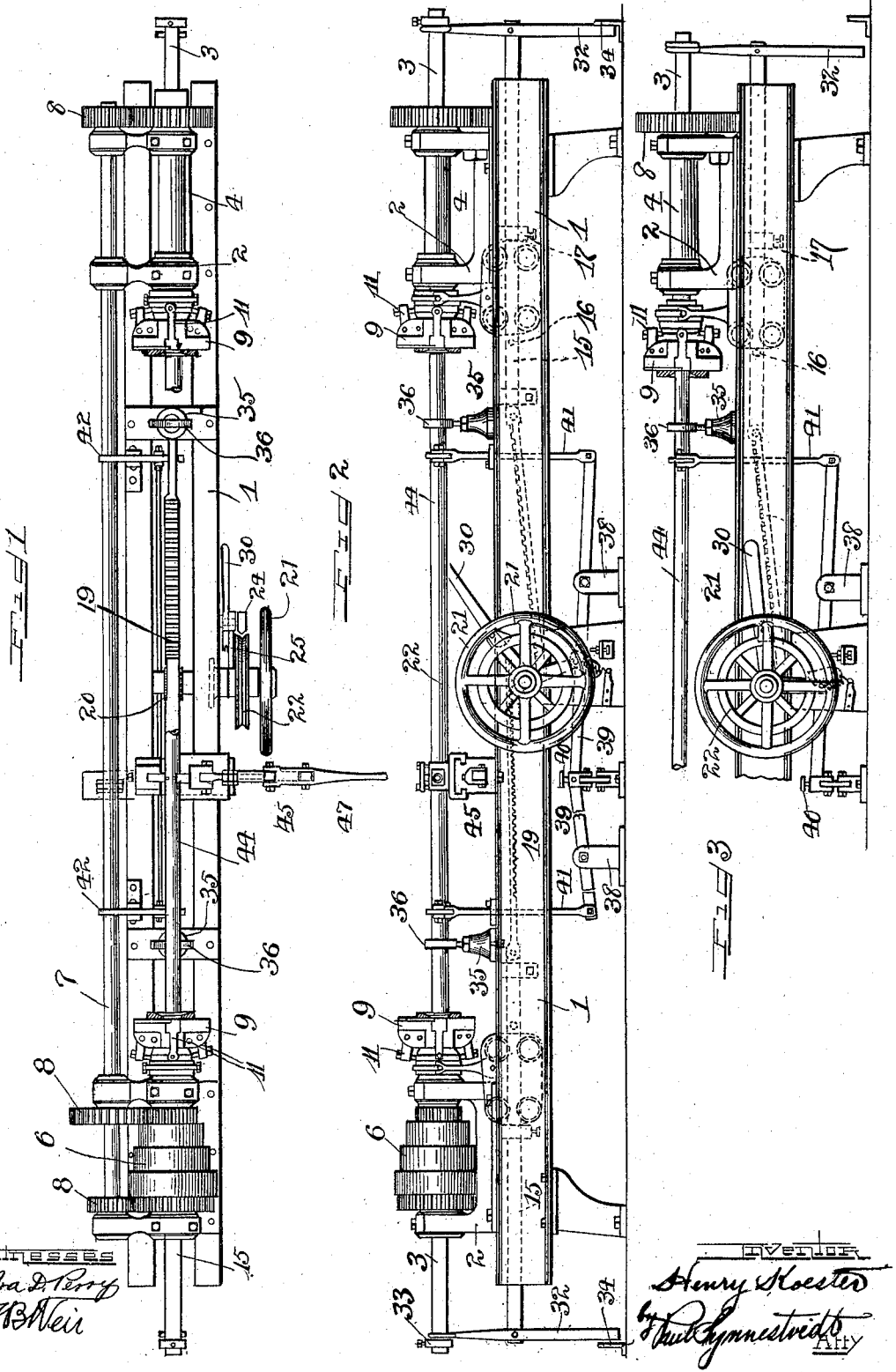

No. 654,461. Patented July 24, 1900.
H. KOESTER.
PIPE THREADING MACHINE.
(Application filed Jan. 15, 1900.)
(No Model.) 5 Sheets—Sheet 2.
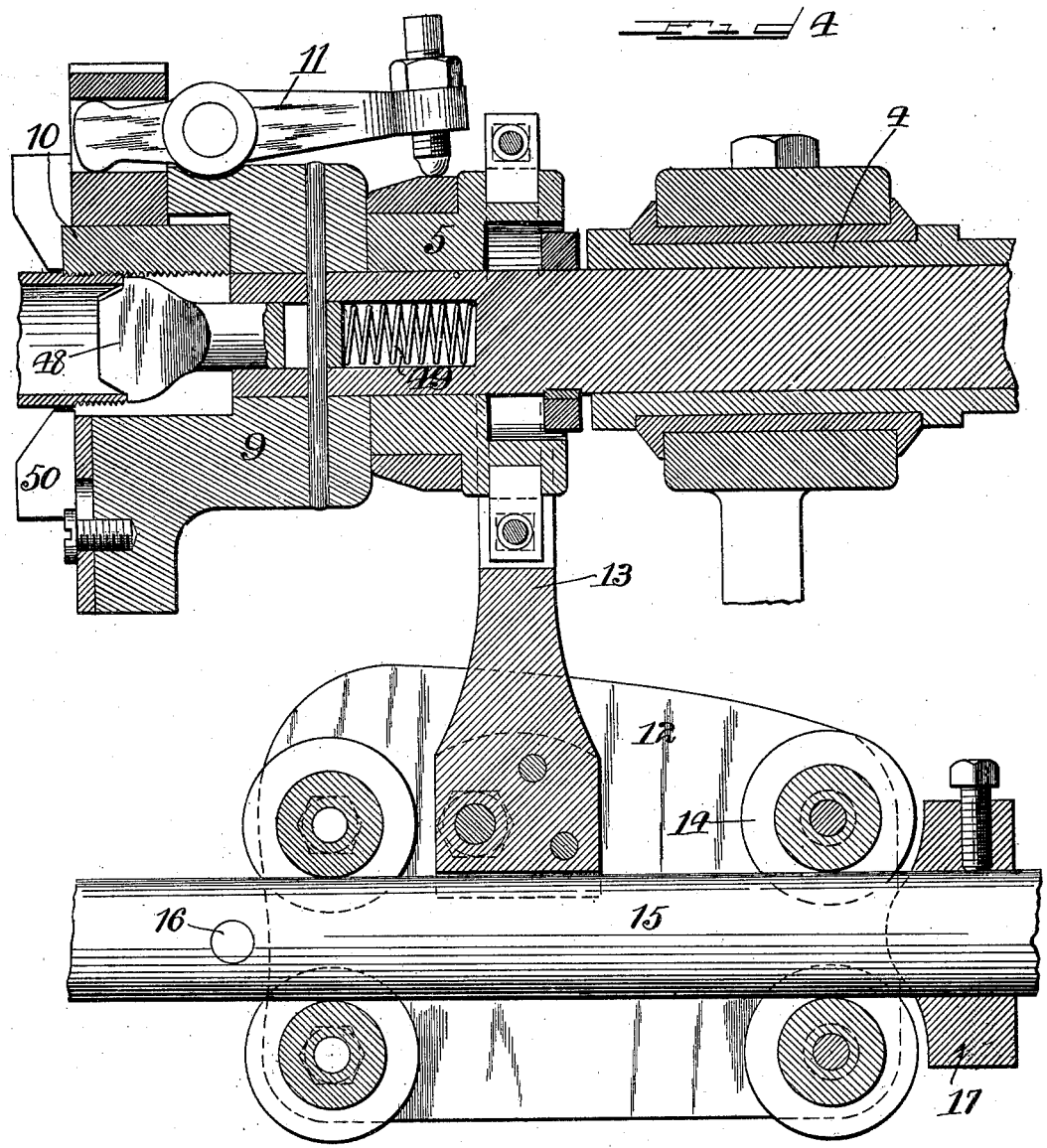

No. 654,461. Patented July 24, 1900.
H. KOESTER.
PIPE THREADING MACHINE.
(Application filed Jan. 15, 1900.)
(No Model.) 5 Sheets—Sheet 3.
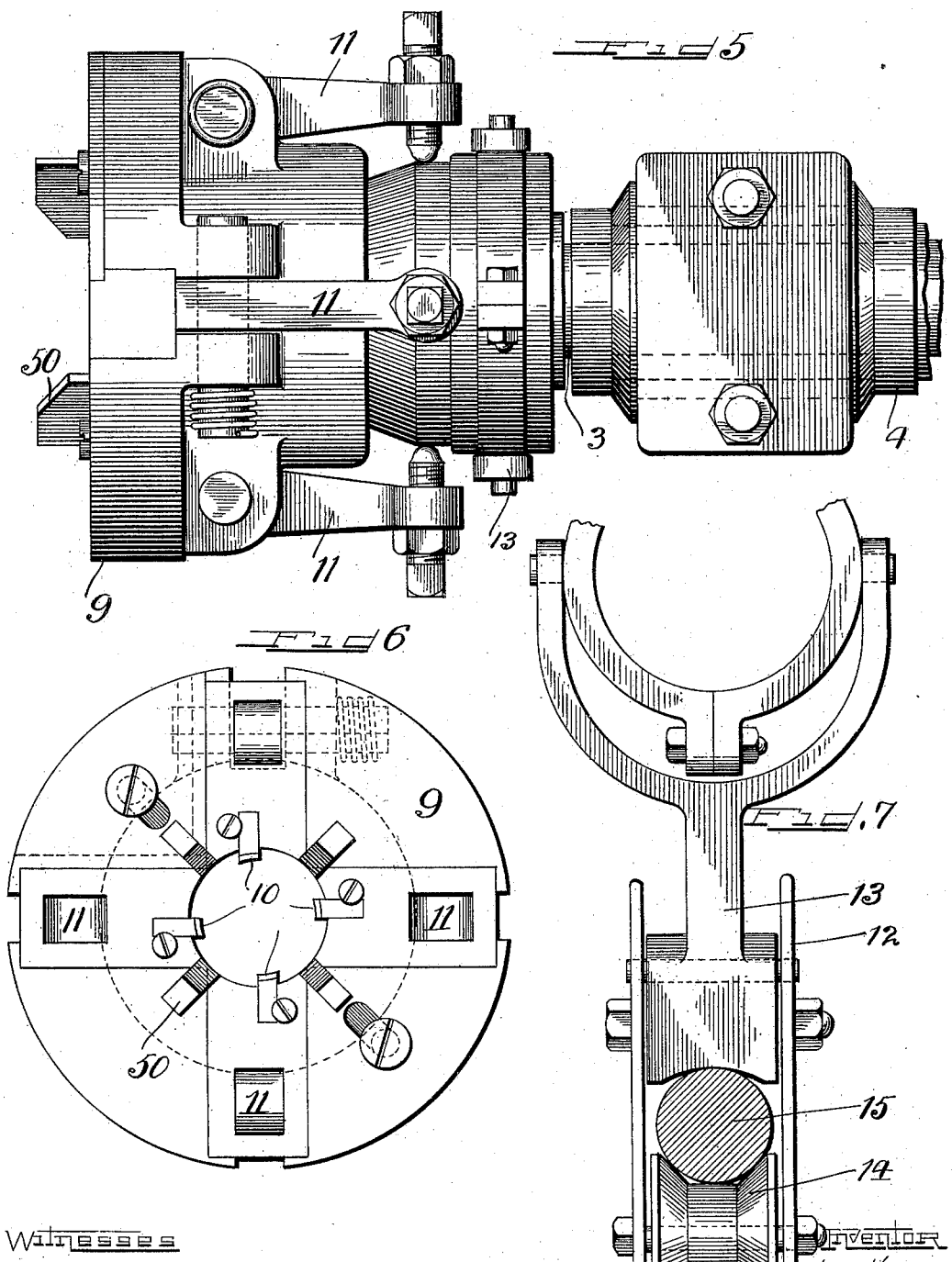

No. 654,461. Patented July 24, 1900.
H. KOESTER.
PIPE THREADING MACHINE.
(Application filed Jan. 15, 1900.)
(No Model.) 5 Sheets—Sheet 4.
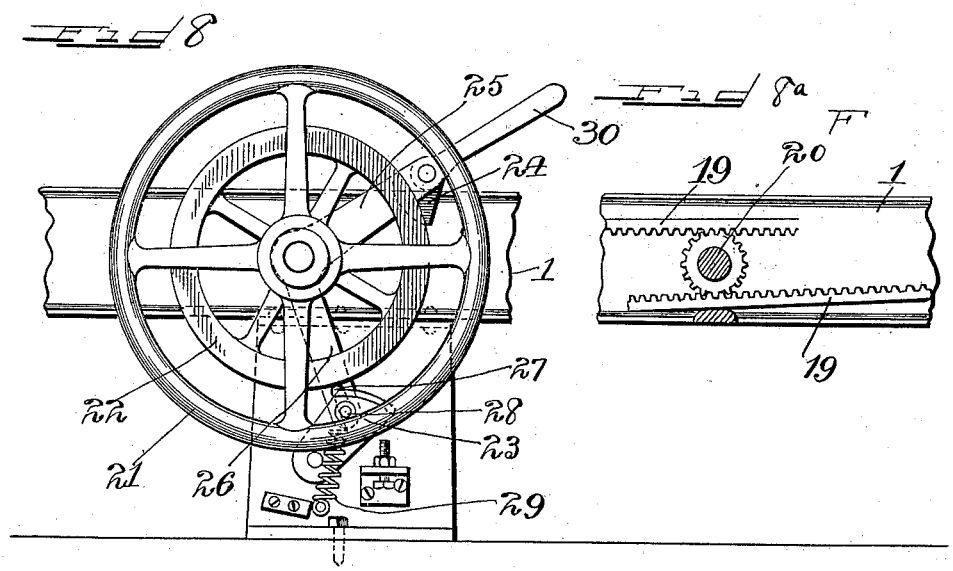
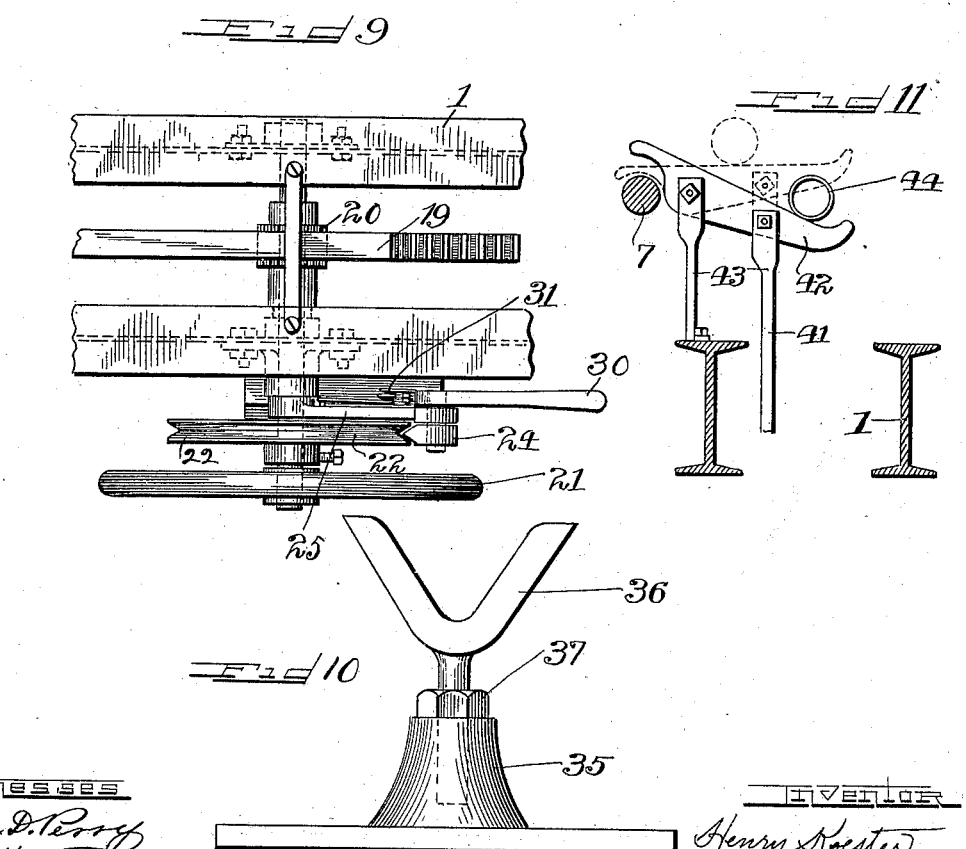
Witnesses
Ira D. Perry
J B Weir
Inventor
Henry Koester
by Paul Synnestvedt Atty No. 654,461. Patented July 24, 1900.
H. KOESTER.
PIPE THREADING MACHINE.
(Application filed Jan. 15, 1900.)
(No Model.) 5 Sheets—Sheet 5.
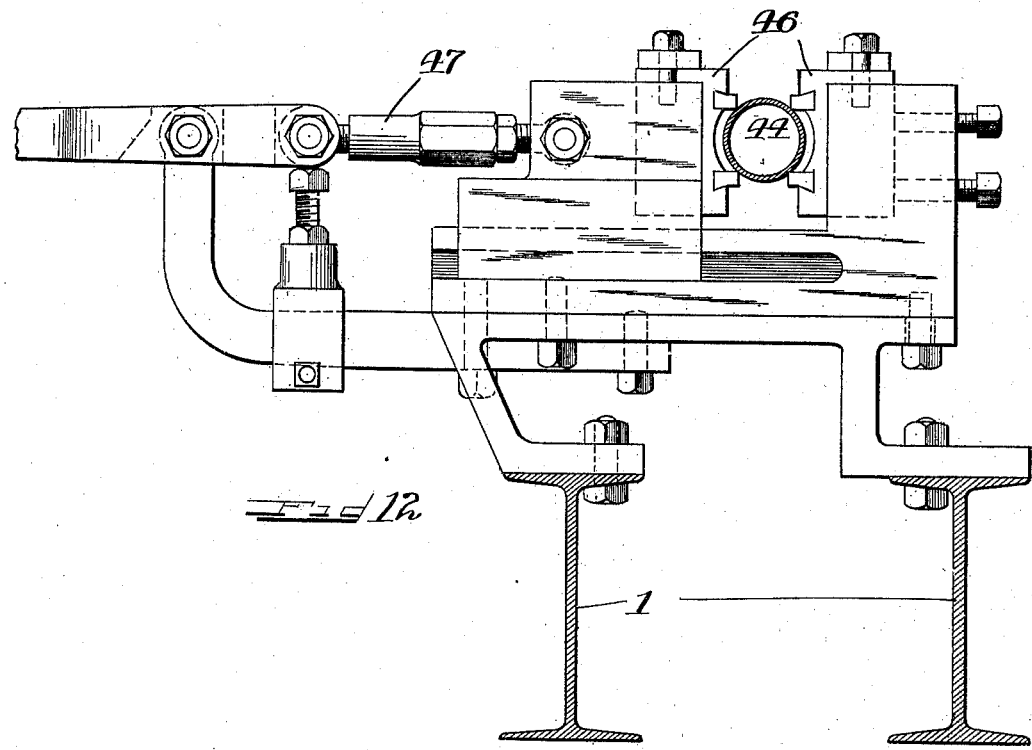
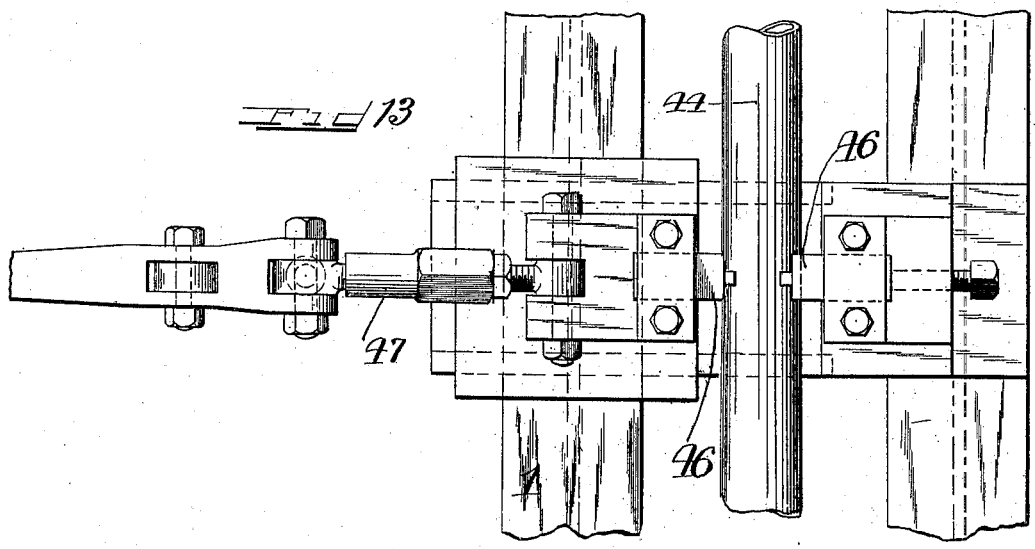
Witnesses
Ira D. Perry
S. B. Weir
Inventor
Henry Koester
by Paul Synnestvedt
Atty

United States Patent Office.

HENRY KOESTER, OF CHICAGO, ILLINOIS, ASSIGNOR TO THE CRANE COMPANY, OF SAME PLACE.

PIPE-THREADING MACHINE.

SPECIFICATION forming part of Letters Patent No. 654,461, dated July 24, 1900.

Application filed January 15, 1900. Serial No. 1,583. (No model.)

*To all whom it may concern:*

Be it known that I, HENRY KOESTER, a citizen of the United States, residing in Chicago, Cook county, Illinois, have invented a certain new and Improved Pipe-Threading Machine, of which the following, taken in connection with the accompanying drawings, is a specification.

My invention relates to machinery for threading pipes or tubes, and has for its object, primarily, the construction of a machine of this class which will be applicable to pipes of considerable length—as, for example, the most common sizes, which run from about fourteen to eighteen feet.

My machine is intended to take care of pipes of varying lengths indiscriminately within a certain reasonable limit—that is, it is especially designed for use where a large number of pipes require threading, among which are various lengths, running all the way from, say, fourteen to twenty feet, depending partly upon the amount of waste material that has been cut away after the pipe is drawn. It is not new with me to thread two ends of a short nipple by a machine operating upon the same at both ends simultaneously, nor is it new with me to provide a machine capable of threading simultaneously the opposite ends of a pipe or tube, broadly speaking; but, so far as I am aware, the prior constructions referred to require a fixed adjustment of the head-blocks and are capable of use only on pipes or tubes of a fixed or predetermined length, and before a pile of tubes can be put through such a machine they must all be cut to the exact length for which the machine is set, unless for each variation in length there be an adjustment of one or both of the head-blocks with relation to the bed of the machine, which obviously involves the expenditure of so much time as to make such method of operation commercially impractical.

Another object of my invention is the provision of a machine in which thread-cutting dies may be moved up to position against the opposite ends of a pipe to be threaded, whether such pipe be long or short, without the need of any adjustment of either of the head-blocks. In order to accomplish this object, the dies are mounted upon slidable driving-shafts carried by the head-blocks, the whole being provided with hand-operated mechanism for moving the dies up to and away from the pipe.

A further object of my invention is the provision of mechanism, in combination with that already described, whereby the dies are caused to automatically collapse when the proper length of thread has been cut and means for regulating the length of such thread with precision and facility.

The hand-operated mechanism referred to I arrange approximately near the middle of the machine, so that it will be readily accessible to the operator from such position and connect with the movable dies in a manner which will be more fully hereinafter explained.

Another object of my invention is the combination, with a pipe-threading machine, of means for lifting the pipe out of the machine after it has been threaded, such means comprising, essentially, a pair of supporting-levers arranged under the pipe and provided with mechanism for elevating them in a manner to raise the pipe out of its position in the machine and cause it to roll off laterally to make way for another pipe in the same position.

The above, as well as such other objects as may hereinafter appear, I attain by means of a construction which I have illustrated in preferred form in the accompanying drawings, in which—

Figure 1 is a plan view embodying my invention. Fig. 2 is a side elevation thereof, showing the parts in position before the dies have been moved up against the ends of the pipe. Fig. 3 is a view showing the parts in the position occupied when the dies have just automatically collapsed. Fig. 4 is an enlarged view showing one of the dies and the carriage mechanism which controls the collapsing thereof. Fig. 5 is a plan view of the die. Fig. 6 is a face view thereof; Fig. 7, an end view of the carriage which transmits motion to the die. Fig. 8 is an enlarged view of the hand operating devices. Fig. 8ª is a section showing a detail of the same; Fig. 9, a plan view thereof; Fig. 10, one of the supports which centers the pipe in the machine. Fig. 11 illustrates the mechanism for removing the pipe from the machine after it has been threaded. Fig. 12 is a side elevation of the vise or clamping mechanism which holds the pipe while it is being threaded, and Fig. 13 is a plan view of the pipe-clamp.

Referring now more particularly to Figs. 1, 2, 3, and 4, it will be seen that in the construction of my machine I provide a bed 1, upon which are mounted head-blocks 2, carrying shafts 3, which are slidably mounted in feather engagement with the sleeves 4 and provided with taper or conical collars 5. The shaft 3 and sleeve 4 are caused to rotate by driving mechanism comprising, essentially, a belt-pulley 6, a back shaft 7, and a suitable set or sets of gears 8, as shown in Fig. 1. Upon the inner ends of the shafts 3 are mounted die-heads 9, carrying thread-cutting collapsible dies 10, operated by levers 11, which bear against the collar 5, that surrounds the shaft. (See Fig. 4.) The shafts 3 are provided with a feathered or other suitable slidable driving device in order to permit them to be moved endwise relative to the sleeves and head-blocks while the latter are fixed, and the collar 5 has some endwise movement relative to the shaft 3.

As a means for operating the die-heads in moving them up to or away from the ends of the pipe I provide the carriage 12, carrying an arm 13, which engages the collar 5 in such a manner as to move the same along the shaft 3, but not interfere with the rotation of the collar. The carriage 12, by means of the anti-friction-rollers 14, is mounted upon a rod 15, between a fixed abutment 16 and an adjustable collar 17. The rods 15 have connections 18 to a couple of racks 19, (see Fig. 2,) which engage a pinion 20, that is arranged to be driven from a hand-wheel 21. (See Figs. 8, 8ª, and 9.)

Adjacent to the wheel 21 there is keyed to the shaft thereof a friction-wheel 22, adapted to coöperate with two friction-pawls 23 and 24, of which the latter, 24, is pivotally mounted in a bell-crank lever 25, the other end of which, 26, is provided at 27 with a slot that engages a pin 28, which imparts motion to the other friction-pawl 23, which is normally held out of contact with the friction-wheel by means of the spring 29.

Fast to the pawl 24 I provide a hand-lever 30 for throwing the said pawl into engagement with the friction-wheel 22. The pawl 24 is normally held out of engagement with the wheel 22 by means of the small spring 31. Upon the outer ends of the rods 15 are pivotally mounted the tail-levers 32, coöperating at one end with the collars 33 on the ends of the shafts 3 and adapted at their other ends to strike against the brackets or stops 34, which are secured to the floor. The purpose of the tail-levers is to reset the thread-cutting dies when they are thrown out away from the ends of the pipe after a thread has been cut and the dies have collapsed.

Upon the bed 1 are secured a couple of sockets or bases 35, in which are adjustably mounted the Y-shaped supports 36, having upon their stems the locking-nuts 37, this mechanism comprising the means for supporting and centering the pipe in the machine. In brackets 38, fastened to the floor, are mounted a couple of levers 39, operated from a foot or treadle piece 40, the levers 39 being attached to rods 41, which pass upwardly and are secured to cross-levers 42, (see Fig. 11,) which are pivotally mounted in brackets 43, secured to the bed of the machine. When the pipe 44 is in position to be threaded, the lever 42 is in the position shown in full lines in Fig. 11. After the threads have been cut a downward pressure on the treadle 40 will raise the pipe 44 upon the end of the lever 42 until the lever 42 occupies the position shown in dotted lines in Fig. 11, when the pipe will roll down and off at the end over the back shaft 7, making way for another pipe to be put in position. Upon the bed of the machine I also mount clamping mechanism for holding the pipe in position, comprising a base 45 and a pair of jaws 46, operated by a toggle-lever device 47, as shown in Figs. 12 and 13.

Within the die-heads 9 I arrange a cutter 48 for trimming off the bur on the inside of the pipe, the said cutter being, as shown in Fig. 4, held in operative position against the tension of a spring 49, so that as the thread is cut the cutter, which is not arranged to cut on the end of the pipe, can yield to permit the pipe to enter farther into the die. To get the pipe centrally into the die, I provide a ring 50, having therein a conical recess.

The operation of my invention is as follows: The parts being in the position shown in Figs. 1 and 2, a pipe is placed in the supports 36, the said supports being adjusted for the proper size of pipe to accurately center the same with reference to the dies. The hand-wheel 21 is now turned, drawing the rods 15 inward, and by means of the carriages 12 bringing the die-heads up against the ends of the pipe. It is apparent that it does not matter what the length of the pipe is so long as it comes within the variable range of the machine—that is, the variation or movement of the die-heads permitted by the length of the shafts 3, which in the machine which I have constructed is approximately eight feet. It is also evident that it does not matter whether the pipe is dropped into the supports 36 a little nearer to one end than the other of the machine, as the rotation of the hand-wheel 21, through rod 15, collar 17, and carriage 12, will push the pipe along until both die-heads are firmly in contact with the ends of the pipe. The pipe having been moved until both die-heads are in contact with the ends thereof is now clamped in position by movement of the toggle-lever 47, of the clamping device. (Shown in Figs. 12 and 13.) The thread is now started by the operator pushing downwardly upon the handle 30, this by the engaging of the friction-pawl 24 causing a rotation of the friction-wheel 22, which carries with it the bell-crank lever 26 and brings the other friction-pawl 23 up into position to lock the wheel 22 against further movement. The parts are so adjusted that the locking-pawl 23 will not stop the movement of the wheel 22 until the dies have gotten sufficiently started in cutting threads upon the pipe to insure the continuance of the cutting operation from the feed effect of the cutters themselves, which then causes the dies to continue to advance inwardly, the pressure of the levers 11 on the collar 5 moving the carriages 12 along, together with the collars 5, until the carriages strike the fixed abutments 16, which prevent further movement of the carriages on account of the rods 15 being locked through the locking-pawl 23, and stopping the inward movement of the conical collars 5 permits the dies to collapse automatically as the levers 11, where they contact with the collars 5, ride down upon the conical face thereof. The dies having collapsed, the cutters are of course free from engagement with the pipe, and the lever 30 is now pulled upward and the wheel 21 rotated to move the die-heads outwardly away from the ends of the pipe until the rods 15 have reached a point where the tail-levers 32 will strike the brackets 34, which will move the shafts 3 still farther in an outward direction and cause the levers 11 of the collapsible dies to ride up again on the conical periphery of the collar 5 into the position shown in Fig. 4, thus bringing the die-cutters into position ready to cut another thread. The clamp-jaws 46 being opened, the operator now pushes downwardly on the treadle 40, and raising the pipe by means of the levers 42 it rolls out of the way backwardly, and the treadle being released and the levers 42 dropping again another pipe can be put into position ready to be threaded.

From an examination of the drawings, and particularly Fig. 4 thereof, it will be seen that by simply changing the position of the collar 17 upon the rod 15 the length of thread which will be cut by the dies can be determined. The greater the lost motion between the carriage and the collar 17 and the fixed abutment 16 the greater is the length of thread that will be cut.

Having thus described my invention, what I claim as new, and desire to secure by Letters Patent, is—

1. In a pipe-threading machine, the combination with a bed, a head-block thereon, a slidable driving-shaft carried by said head-block, a thread-cutting die carried by said shaft and mechanism for driving said shaft, of hand-operated mechanism for moving said die up to the end of the pipe, and hand-operated mechanism for starting the thread upon the pipe comprising a friction-wheel, a driving-pawl for said friction-wheel, a locking-pawl, and means whereby the motion imparted to said friction-wheel by said driving-pawl brings the locking-pawl into engagement to lock the friction-wheel against further motion, substantially as described.

2. The combination with a pipe-threading machine, of mechanism for removing the threaded pipes therefrom comprising levers extending under the pipe and mechanism for elevating said levers to lift the pipe out of position in the machine and by bringing said levers to an inclined position, permitting the pipe to roll off the levers, substantially as described.

3. In a pipe-threading machine, the combination with a bed, a head-block thereon, a slidable driving-shaft carried by said head-block, a screw-cutting die carried by said shaft, and mechanism for driving said shaft, of hand-operated mechanism for moving said die up to the end of the pipe, and hand-operated mechanism separate from said first-mentioned hand-operated mechanism for starting the thread upon the pipe, substantially as described.

4. In a pipe-threading machine, the combination with a bed, a head-block thereon, a slidable driving-shaft carried by said head-block, a screw-cutting die carried by said shaft, and mechanism for driving said shaft, of hand-operated mechanism for moving said die up to the end of the pipe, and hand-operated mechanism separate from said first-mentioned hand-operated mechanism for starting the thread upon the pipe, and means whereby the motion imparted to the dies by said second hand-operated mechanism is automatically checked, substantially as described.

5. A pipe-threading machine comprising a bed, head-blocks thereon, slidable driving-shafts carried by said head-blocks, cutting-dies upon the inner ends of said shafts, mechanism for driving said shafts, hand-operated mechanism for moving said dies into contact with the ends of the pipe, a second set of mechanism for starting the thread upon the pipe separate from said hand-operated mechanism, and mechanism substantially as described, whereby said last-mentioned mechanism is locked in predetermined position to collapse the dies when the proper length of thread has been cut, substantially as set forth.

HENRY KOESTER.

Witnesses:
F. C. BRIGHTLY,
JOHN E. JOHNSON.